(12) United States Patent  
Gribble et al.

(10) Patent No.: US 9,043,043 B1
(45) Date of Patent: May 26, 2015

(54) AUTONOMOUS FLIGHT CONTROLS FOR PROVIDING SAFE MODE NAVIGATION

(75) Inventors: David A. Gribble, Cedar Rapids, IA (US); David L. Leedom, Center Point, IA (US); Colin D. Reed, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 203 days.

(21) Appl. No.: 13/241,571

(22) Filed: Sep. 23, 2011

(51) Int. Cl.
  *G05D 1/00* (2006.01)
  *G05D 1/10* (2006.01)
  *B64C 13/20* (2006.01)

(52) U.S. Cl.
  CPC . *G05D 1/00* (2013.01); *B64C 13/20* (2013.01); *G05D 1/10* (2013.01)

(58) Field of Classification Search
  CPC ............. G05D 1/10; G05D 1/00; B64C 13/20
  USPC .............................................. 701/1, 3, 11, 16
  See application file for complete search history.

(56) References Cited

U.S. PATENT DOCUMENTS

| | | | |
|---|---|---|---|
| 6,739,556 B1 * | 5/2004 | Langston | 244/189 |
| 6,845,302 B2 * | 1/2005 | Moretto | 701/3 |
| 7,729,817 B2 * | 6/2010 | Duranti et al. | 701/11 |
| 8,180,503 B2 * | 5/2012 | Estabrook et al. | 701/3 |
| 2003/0130791 A1 * | 7/2003 | McIntyre | 701/213 |
| 2006/0105746 A1 * | 5/2006 | Pirila et al. | 455/411 |
| 2007/0050101 A1 * | 3/2007 | Sacle et al. | 701/11 |
| 2008/0039988 A1 * | 2/2008 | Estabrook et al. | 701/14 |
| 2009/0105890 A1 * | 4/2009 | Jones et al. | 701/1 |
| 2009/0179114 A1 * | 7/2009 | Conner | 244/189 |
| 2009/0319104 A1 * | 12/2009 | Bailly et al. | 701/16 |

* cited by examiner

*Primary Examiner* — Yonel Beaulieu
*Assistant Examiner* — Martin Weeks
(74) *Attorney, Agent, or Firm* — Angel N. Gerdzhikov; Donna P. Suchy; Daniel M. Barbieri

(57) ABSTRACT

The present invention is directed to a flight controls system and a method for navigating an aircraft via the flight controls system implemented on-board an aircraft. The flight controls system may provide a first mode for allowing the aircraft to be autonomously navigated safely to a loiter zone in the event the pilot becomes incapacitated or unable to operate the aircraft. Further, the flight controls system may provide a second mode for providing autonomous landing functionality for the aircraft when the engines of the aircraft have failed.

18 Claims, 5 Drawing Sheets

AUTONOMOUS FLIGHT CONTROLS FOR PROVIDING SAFE MODE NAVIGATION

FIELD OF THE INVENTION

The present invention relates to the field of avionics systems and particularly to autonomous flight controls with safe mode navigation.

BACKGROUND OF THE INVENTION

Currently available avionics systems provide limited or no capabilities in the event of: the incapacitation of a pilot; the inability of the pilot to navigate the aircraft; and/or aircraft mechanical malfunction. Traditionally, these capabilities have been limited to automatic flight control systems which allow the aircraft to: maintain course; maintain heading; maintain altitude and/or to follow a flight plan.

Thus, it would be desirable to provide avionics systems (ex.—flight controls) which obviate problems associated with currently available solutions.

SUMMARY OF THE INVENTION

Accordingly, an embodiment of the present disclosure is directed to a method for navigating an aircraft via a flight controls system implemented on-board the aircraft, the method including: dynamically determining safe zones and navigation paths to the safe zones for the aircraft; receiving a mode input for causing a safe mode of the system to be engaged; establishing the system in the safe mode in response to the received mode input; causing a mode engage status indicator to be provided; determining a time at which navigation via a navigation path included amongst the determined navigation paths to a safe zone included amongst the determined safe zones is to commence; providing a time indicator which indicates a proximity to the commencement time; when a subsequent mode input is received, disengaging from the safe mode; selecting a safe zone and navigation path to the safe zone from amongst the dynamically determined safe zones and navigation paths; providing a flight plan to a Flight Management System (FMS) of the flight controls system based upon the selected safe zone and selected navigation path to the selected safe zone; monitoring aircraft threats; based upon said monitoring of threats (ex.—if a threat is detected in a current flight path of the aircraft), navigating the aircraft to the safe zone prior to the determined safe zone navigation commencement time; otherwise, when the safe zone navigation commencement time is reached, causing the flight plan to be executed; navigating the aircraft to the selected safe zone via the selected navigation path; providing an indication that the aircraft is being navigated to the selected safe zone; providing an emergency message; when the aircraft has reached the selected safe zone, maintaining a position of the aircraft within the selected safe zone; and providing an arrived and holding message.

A further embodiment of the present disclosure is directed to a method for navigating an aircraft via a flight controls system implemented on-board the aircraft, the method including: dynamically monitoring engine status of the aircraft; dynamically determining and prioritizing potential landing sites for the aircraft; dynamically notifying a Flight Management System (FMS) of the potential landing sites; when engines of the aircraft fail, providing a notification that said failure has occurred; providing an indication of the dynamically determined potential landing sites; receiving an input selecting a potential landing site in response to the provided indication; establishing a flight plan and setting a target speed of the aircraft based on the received input; providing a flight plan indicator based upon the flight plan; providing guidance instructions for navigating the aircraft (if autopilot is not being used); otherwise, navigating the aircraft towards the selected potential landing site; and continually updating the flight plan in response to any aircraft performance and/or environmental changes.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Currently available avionics systems provide limited or no capabilities in the event of: the incapacitation of a pilot; the inability of the pilot to navigate the aircraft; and/or aircraft mechanical malfunction. Traditionally, these capabilities have been limited to automatic flight control systems which allow the aircraft to: maintain course; maintain heading; maintain altitude and/or to follow a flight plan. In the present disclosure, an avionics system is provided with the capability to autonomously navigate the aircraft to a safe position in the event of pilot incapacitation, pilot inability and/or aircraft mechanical malfunction.

Figure 1:
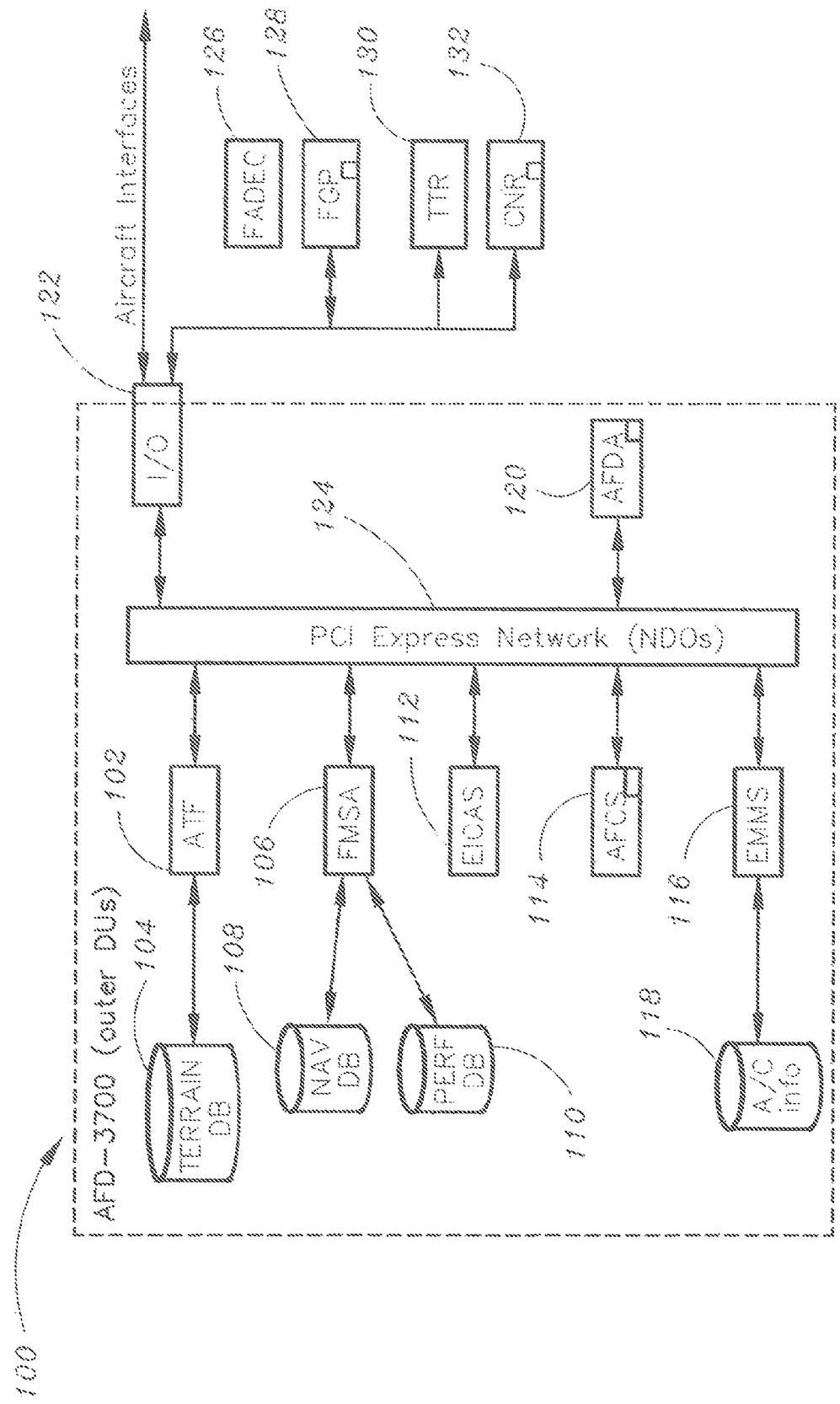
FIG. 1 is a block diagram of a flight controls system in accordance with an exemplary embodiment of the present disclosure.

Referring to FIG. 1, a flight controls system in accordance with an exemplary embodiment of the present disclosure is shown. The flight controls system 100 may be implemented on-board an aircraft. In an embodiment of the present disclosure, the system 100 may include an Advanced Terrain Function (ATF) system 102. In further embodiments of the present disclosure, the ATF system 102 may be connected to a terrain database 104, the terrain database 104 configured for storing terrain data. In still further embodiments of the present disclosure, the system 100 may include a Flight Management System (FMS) (ex.—a Flight Management System Application (FMSA)) 106.

In exemplary embodiments of the present disclosure, the FMS 106 may be connected to a navigation database (NAV DB) 108. In further embodiments of the present disclosure, the FMS 106 may be connected to a performance database (PERF DB) 110. The FMS 106 may be a computer system that is configured for managing a flight plan of the aircraft while the aircraft is in-flight. The FMS 106 may be configured for using various sensors (ex.—Global Positioning System (GPS); Inertial Navigation System (INS) often backed up by radio navigation) to determine the aircraft's (ex.—in-flight) position and to guide the aircraft along the flight plan. The FMS 106 may be controlled from the cockpit of the aircraft via a control display unit (CDU) which may incorporate a small screen and keyboard or touch screen. The FMS 106 may be further configured for sending the flight plan for display on an Electronic Flight Instrument System (EFIS), navigation display (ND), or multi-function display (MFD) (ex.—the MFD may display navigation and weather information from multiple systems). In still further embodiments of the present disclosure, the system 100 may further include an Engine Indicating and Crew Alerting System (EICAS) 112. In further embodiments of the present disclosure, the system 100 may further include an Automatic Flight Control System (AFCS) 114. In still further embodiments of the present disclosure, the system 100 may further include an Emergency Mission Management System (EMMS) 116.

In embodiments of the present disclosure, the system 100 may further include an aircraft information database 118. In further embodiments of the present disclosure, the aircraft information database 118 may be connected to the EMMS 116. In still further embodiments of the present disclosure, the system 100 may further include an Adaptive Flight Display (AFD) (ex.—an Adaptive Flight Display Application (AFDA)) 120. In further embodiments of the present disclosure, the system 100 may further an input/output (I/O) interface 122. In still further embodiments of the present disclosure, the I/O interface 122 may be configured for being connected to one or more aircraft interfaces.

In exemplary embodiments of the present disclosure, the system 100 may further include a bus, such as Peripheral Component Interconnect (PCI) Express network bus 124. In further embodiments of the present disclosure, the ATF 102, FMSA 106, EICAS 112, AFCS 114, EMMS 116, I/O interface 122 and AFD 120 may each be connected to (ex.—interconnected via) the bus 124. In still further embodiments of the present disclosure, the system 100 may further include a Full Authority Digital Engine Control (FADEC) system 126. In further embodiments of the present disclosure, the system 100 may further include a Flight Guidance Panel (FGP) 128. In still further embodiments of the present disclosure, the system 100 may further include a Traffic Collision Avoidance System (TTR or TCAS) 130.

In embodiments of the present disclosure, the system 100 may further include a communication network radio (CNR) 132. In further embodiments of the present disclosure, the FADEC system 126, the FGP 128, the TTR 130 and the CNR 132 may each be connected to the I/O interface 122 via bus 134.

In exemplary embodiments of the present disclosure, the EMMS 116 may be configured for interfacing with the FMS 106 and determining (ex.—reading) a position of the aircraft (as obtained by interfacing with the FMS 106). In further embodiments of the present disclosure, the EMMS 116 may be configured for querying the NAV DB 108 to determine: the location(s) of the nearest airport(s), runway data and/or available approaches. In still further embodiments of the present disclosure, the EMMS 116 may be configured for changing a flight plan of the aircraft. For instance, the EMMS 116 may be configured for inserting waypoints (ex.—L/L waypoints), changing a destination airport for the aircraft and changing an arrival procedure for the aircraft. In further embodiments, the EMMS 116 may be configured for reading data from the performance database (PERF DB) 110, including fuel at the aircraft destination.

In embodiments of the present disclosure, the EMMS 116 may be configured for interfacing with the AFCS 114. In further embodiments, the EMMS 116 may be configured for controlling a Flight Director (FD) of the aircraft (the FMS 106 may also be configured for controlling the FD). The FD may be visual cues which are overlaid onto an attitude indicator, showing the attitude required for the aircraft to follow a certain trajectory. In still further embodiments, the AFCS 114 may be configured for directing the EMMS 116 when to engage and disengage.

In exemplary embodiments of the present disclosure, the EMMS 116 may be configured for interfacing with the AFDA 120. In further embodiments, the EMMS 116 may be configured for accessing and/or displaying data which may be displayed by the AFD 120, such as altitude data, airspeed data, groundspeed data and/or wind data for the aircraft. Further, the EMMS 116 may be configured for displaying any of various types of annunciation data (ex.—annunciations).

In embodiments of the present disclosure, the EMMS 116 may be configured for interfacing with the ATF system 102. In further embodiments, the EMMS 116 may be configured for reading data corresponding to terrain posts and/or obstacles located along the aircraft's flight path (ex.—along the aircraft track).

In exemplary embodiments of the present disclosure, the EMMS 116 may be configured for interfacing with the TTR 130 to access data corresponding to observed traffic in the flight area of the aircraft. In further embodiments of the present disclosure, the EMMS 116 may be configured for interfacing with the EICAS 112 for accessing engine status data of the aircraft (ex.—to determine if both engines of the aircraft are out or to determine other aircraft performance values). In still further embodiments of the present disclosure, the EMMS 116 may be configured displaying EICAS messages (ex.—Crew Alerting System (CAS) messages, including a countdown timer) for the aircraft.

In embodiments of the present disclosure, the flight controls system 100 described above may have functionality which may provide assistance to a flight crew member (ex.—pilot) in a number of different situations. For example, when the pilot is incapacitated and/or becomes unable to navigate the aircraft, the flight controls system 100 may be configured for providing (ex.—for being established in) a first mode (ex.—a loiter mode; a safe mode) that allows the aircraft to be automatically navigated in a safe manner while the pilot recovers. In exemplary embodiments, the aircraft may be equipped with (ex.—may include) an autothrottle and a radar altimeter for facilitating navigation of the aircraft. When the flight controls system is established in loiter/safe mode, the aircraft is automatically navigated by the flight controls system 100 to a safe location (ex.—safe point; loitering point; safe area; loitering area; safe airspace; loitering airspace) as determined by the system 100. In further embodiments, the transition to safe mode may be an automatic, time-based transition as will be discussed further below.

In exemplary embodiments of the present disclosure, in the absence of the pilot, the system 100 may be configured for determining (ex.—selecting) the loitering point for the aircraft. The considerations for determination/selection of the loitering point include selecting a loitering point which places and maintains the aircraft in position(s) which are safe from hazard. For instance, a loitering point (ex.—loitering area; loitering zone) may be determined/selected by the system 100 based upon evaluation of terrain data and charted obstacles data in a proximity (ex.—airspace) of the aircraft. Further, a loitering point may be determined/selected by the system 100 based upon the fact that it allows the aircraft to laterally avoid Class B, C and/or D airspace. In further embodiments, an algorithm(s) may be implemented by the system 100 for determining the safe point. In further embodiments of the present disclosure, when in loitering mode, after the aircraft has been automatically directed to the loitering area, the aircraft may be automatically maintained in the loitering area, for instance, until such time as the pilot is able to resume navigating the aircraft. In further embodiments, other aircraft sensor data may be used: for selecting a safe point; during navigation to a safe point; and/or in loitering at a safe point. This sensor data may include: traffic data (obtained via the TTR 130); terrain data (obtained via the ATF system 102 and/or the terrain database 104); obstacles data (obtained via the ATF system 102 and/or the terrain database 104); and/or weather data (obtained via on-board or datalinked weather radar (not shown)).

In further embodiments of the present disclosure, the system 100 may be further configured for being established in a second mode (ex.—autonomous landing mode) for providing assistance to a pilot in the event that the aircraft is running low on fuel and the pilot is incapacitated or unable to navigate the aircraft. For example, when the aircraft has been loitering at the safe point and begins to run low on fuel, the system 100 may be established in the autonomous landing mode. Further, the system 100 may be configured for automatically preparing the aircraft to make a landing. For instance, the aircraft may be automatically directed to a safe/loitering area (ex.—if the aircraft has autothrottle and radar altimeter functionality) and/or maintained by the system 100 in a safe/loitering area until the system 100 detects that the fuel of the aircraft has reached its reserves. The system 100 may then be configured for accessing data for determining (ex.—selecting) a best airport (ex.—nearest airport) and a best approach to which to direct the aircraft. The system 100 may then be configured for automatically navigating the aircraft onto/along the selected approach and to the selected airport. The system 100 (ex.—an autopilot function of the system 100) may be further configured for directing the aircraft downward towards or near the runway (ex—not an autolanding). For instance, the impact of the aircraft on the runway may be a flared impact under power, such that the aircraft may be damaged if the landing gear is not established in the down position. In the event that the aircraft does not have autothrottle and radar altimeter functionality, the system 100 may be configured to maintain the aircraft at the safe area until the fuel supply of the aircraft is exhausted, then the system 100 may be configured to glide the aircraft to the runway, such that said aircraft arrives at the runway at minimum or low speed, with no fuel. The impact on such instance will not be a flared impact and some aircraft damage would be expected.

In further embodiments, when determining which airport that the aircraft should be directed to in the case of engine(s) failure (ex.—when the aircraft has no functioning engines), the system 100 may consider various factors. For example, as mentioned above, the nearest airport to the aircraft will be given preference. Such nearest data may be accessed by the system 100 via the EMMS 116 interfacing with the FMS 106. Further, runways of the nearest airport may be prioritized and selected based upon the following data: runway length and runway width. For example, the system 100 would preferably select a longest and/or widest runway for emergency landing. The runway length and width data may be obtained via the NAV database 108. Still further, priority may be given during selection to runways which would direct the aircraft into a surface wind.

In alternative embodiments, the pilot may select the best/nearest airport and runway for making a landing and may provide it as input(s) to the system 100. The system 100, based upon the input(s), may then automatically direct the aircraft (ex.—via an autopilot function of the system 100) to the selected airport and runway. The pilot may then land the airplane on the runway.

Figure 2A:
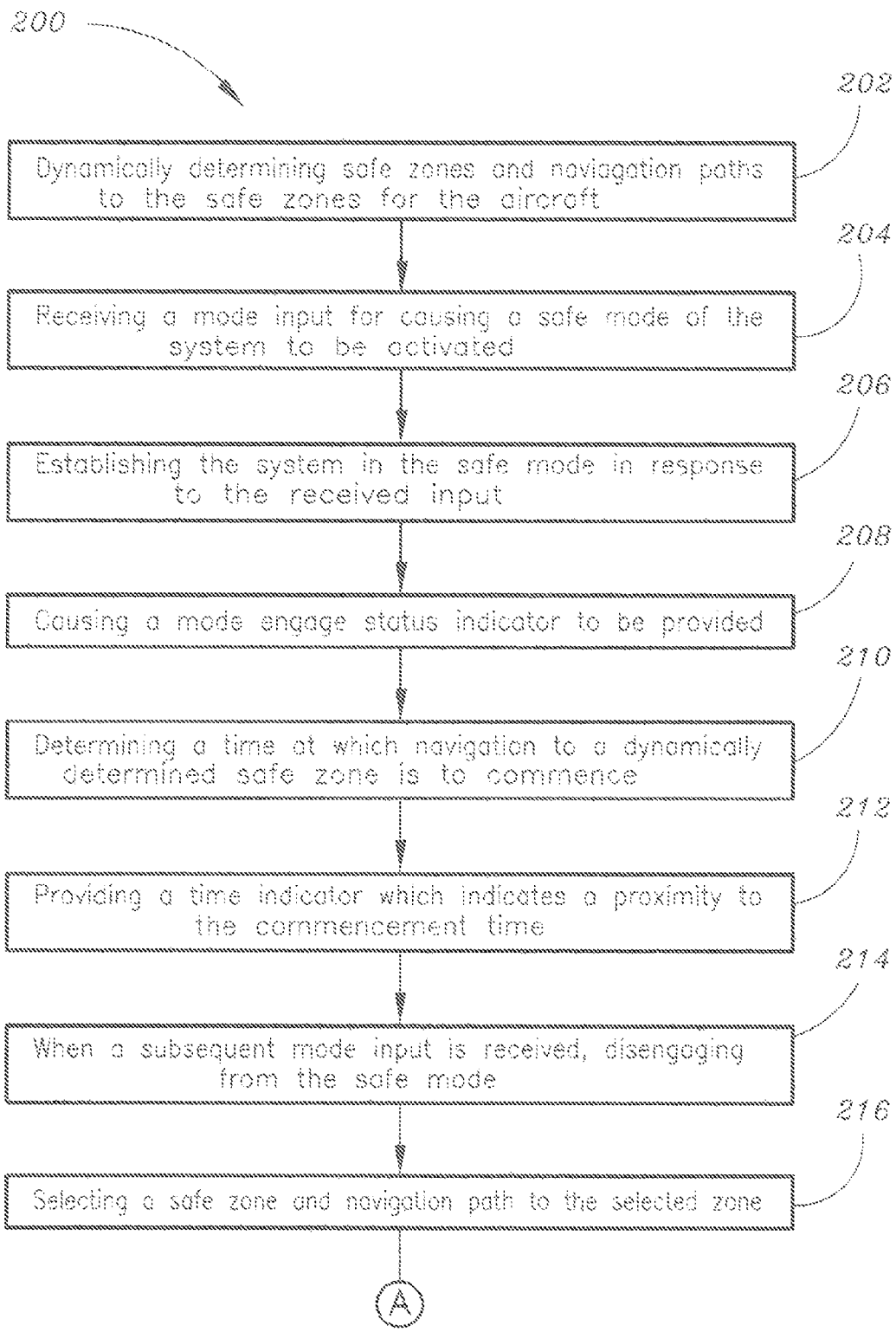
FIGS. 2A and 2B depict a flow chart illustrating a method for providing navigation (ex.—safe mode navigation), such as via the flight controls system shown in FIG. 1, in accordance with an exemplary embodiment of the present disclosure.
Figure 2B:
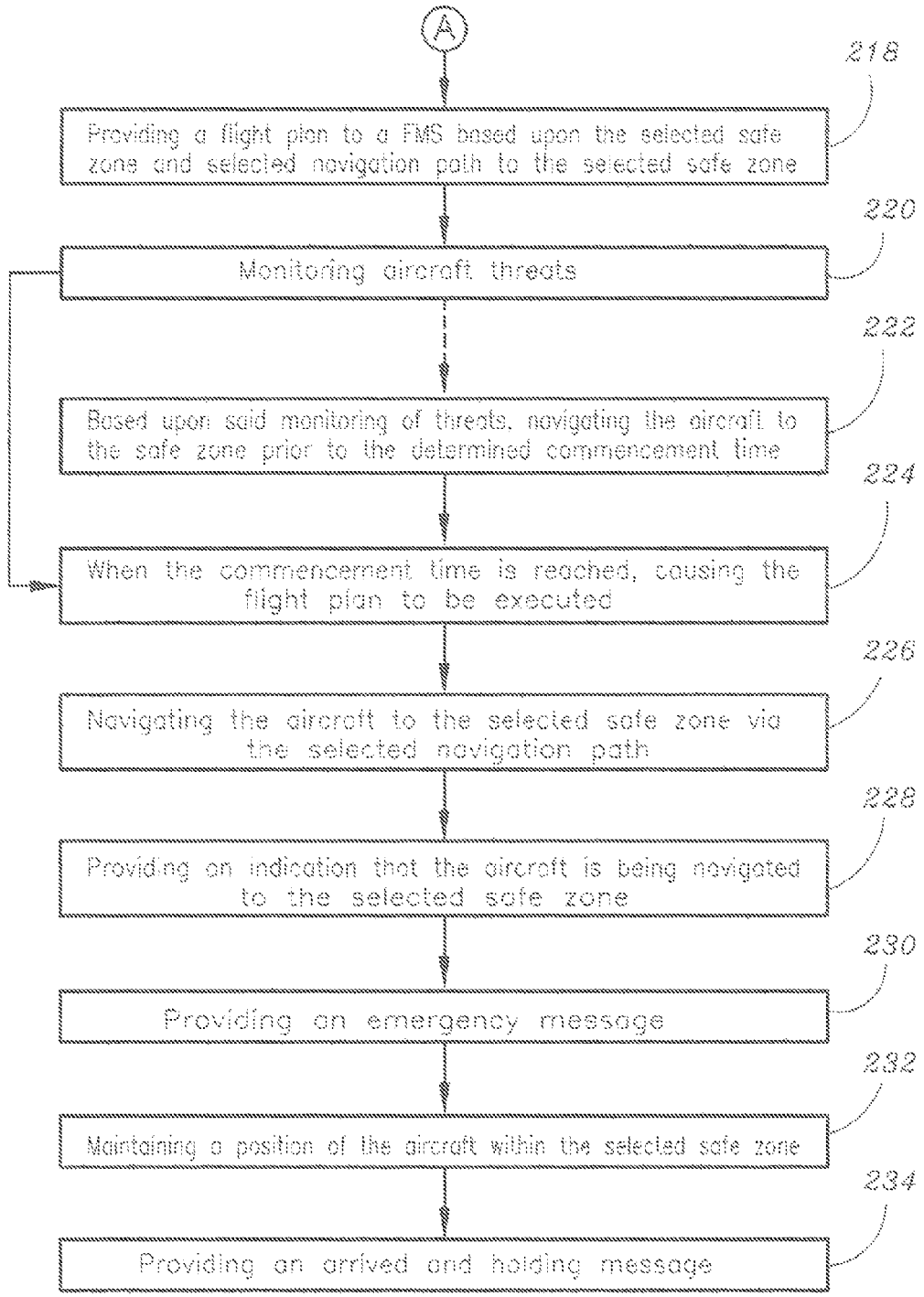

Referring to FIGS. 2A and 2B, a flowchart illustrating a method for navigating an aircraft via a flight controls system implemented on-board the aircraft, such as the flight controls system 100 described above, in accordance with an exemplary embodiment of the present disclosure is shown. The method 200 may include the step of dynamically determining loiter zones and navigation paths to the loiter zones for the aircraft 202. For instance, the EMMS 116 of the system 100 may continuously determine (ex.—calculate) safe zones (ex.—safe points; loiter zones) and navigation paths to those safe zones for the aircraft. During this process of determining the safe zones and paths to the safe zones, the EMMS 116 may interface with the ATF 102 of the system 100 to access data from the terrain database 104. In further embodiments, the method 200 may further include the step of receiving an input (ex.—user input, mode input) for causing a safe mode of the system 100 to be activated 204. For instance, a flight crew member (ex.—pilot) may provide the input by pressing a button of a user input interface of the system 100. Alternative embodiments would not require a button push, but would allow the system 100 to enter the safe mode autonomously.

In exemplary embodiments of the present disclosure, the method 200 may further include the step of establishing the system in the safe mode in response to the received input 206. For instance, in response to the received input, the AFCS 114 of the system 100: may recognize (ex.—detect) the button push; may engage (ex.—even in extreme attitudes), thereby causing the aircraft to roll level and to automatically maintain its current barometric altitude (ex.—its barometric altitude at the time of the button push); and may notify the EMMS 116 of the input/button press. In further embodiments of the present disclosure, the method 200 further includes the step of causing a mode engage status indicator to be provided 208. For instance, the EMMS 116 of the system 100 may notify the EICAS 112 of the mode engagement and the EICAS 112 may provide a CAS message indicating that the safe mode has been engaged/activated.

In embodiments of the present disclosure, the method 200 may further include determining a time at which navigation via a navigation path included amongst the determined navigation paths to a safe zone included amongst the determined safe zones is to commence 210. For example, the system 100 may determine the time at which navigation to the safe zone is to commence and the system 100 (ex.—the EMMS 116 of the system 100) may decrement a countdown clock which counts down to the safe zone navigation commencement time. In further embodiments, the method 200 may further include the step of providing a time indicator which indicates a proximity to the commencement time 212. For instance, the EMMS 116 may cause time indicators (ex.—CAS messages) to be provided indicating a proximity to safe zone navigation commencement time, such as indicating that navigation to the safe zone will begin in one minute, 30 seconds, 10 seconds, or the like. In further embodiments, the method 200 may include the step of, when a subsequent mode input is received, disengaging from the safe mode 214. For example, if at any point, such as during the countdown to the safe zone navigation commencement time, a user (ex.—pilot) pushes the button again, the safe mode may be disengaged.

In exemplary embodiments of the present disclosure, the method 200 may further include selecting a safe zone and navigation path to the safe zone from amongst the dynamically determined (ex.—calculated) safe zones and navigation paths 216. For example, the EMMS 116 may select a safe zone and navigation path to that safe zone from amongst the plurality of determined safe zones and determined navigation paths. In further embodiments of the present disclosure, the method 200 may further include providing a flight plan to a FMS based upon the selected safe zone and selected navigation path to the selected safe zone 218. For instance, the flight plan may include: the selected safe zone; the selected/calculated navigation path to the selected safe zone; and a directive for causing the aircraft to hold position within the selected safe zone once the aircraft navigates to the selected safe zone.

In embodiments of the present disclosure, the method 200 may further include the step of monitoring aircraft threats 220. For example, the EMMS 116 of the system 100 may utilize a logic tree to monitor threats or hazards to the aircraft, such as terrain or other obstacles (ex.—charted obstacles) in a current flight path of the aircraft. In further embodiments of the present disclosure, the method 200 may further include the step of, based upon said monitoring of threats, navigating the aircraft to the safe zone prior to the determined safe zone navigation commencement time 222. For instance, the EMMS 116 may detect a threat in the current flight path of the aircraft which may collide with the aircraft prior to the safe zone navigation commencement time if the aircraft continues along its current flight path, thus, the EMMS 116 may cause navigation of the aircraft to the safe zone to begin early (prior to the previously determined safe zone navigation commencement time) to avoid the threat/hazard.

In exemplary embodiments of the present disclosure, the method 200 may further include the step of, when the safe zone navigation commencement time is reached (ex.—when timeout expires), causing the flight plan to be executed 224. For instance, the EMMS 116 may cause the flight plan to be executed. During execution of the flight plan, EMMS 116 may notify displays of the system 100 and the FMS 106 that it is taking over control of the aircraft. Further, the system 100 may select the FMS 106 as the navigation source (if needed) and may notify EICAS 112. Still further, the AFCS 114 may select a navigation (NAV) mode and visual navigation (VNAV) mode for the aircraft.

In embodiments of the present disclosure, the method 200 may further include the step of navigating the aircraft to the selected safe zone via the selected navigation path 226. For instance, when the safe zone navigation commencement time is reached, the system 100 (ex.—the FMS 106 of the system 100) may navigate the aircraft to the selected safe zone via the selected navigation path. In further embodiments of the present disclosure, the method 200 may further include the step of providing an indication that the aircraft is being navigated to the selected safe zone 228. For example, the system 100 may cause a CAS message to be provided, indicating that the aircraft is being or has been navigated to the safe zone.

In exemplary embodiments of the present disclosure, the method 200 may further include the step of providing an emergency message 230. For instance, the EMMS 116 may be configured for tuning a transponder of the aircraft to 7700, COM to 121.5, and sending an emergency controller pilot data link communication (CPDLC) message. Radios may respond as if the pilot sent (ex.—initiated) the emergency message. In further embodiments of the present disclosure, the method 200 may further include maintaining a position of the aircraft within the selected safe zone 232. For instance, when the aircraft arrives at the selected safe zone/safe point, it may enter a hold (ex.—the system 100 may cause the aircraft to have its position maintained within the selected safe zone). In further embodiments of the present disclosure, the method 200 may further include the step of providing an arrived and holding message 234. For example, EMMS 116 may notify EICAS 112 that the aircraft has arrived at the safe zone and a CAS message may be provided by the system 100 indicating that the aircraft is holding at the safe zone.

In embodiments of the present disclosure, safe mode, as described above, may be implemented by the system 100 of the aircraft in conjunction with Emergency Descent Mode (EDM), the EDM being triggered by cabin de-pressurization. For example, loiter/safe mode may be automatically triggered by EDM, but no action may be taken until the aircraft reaches a safe altitude.

Figure 3A:
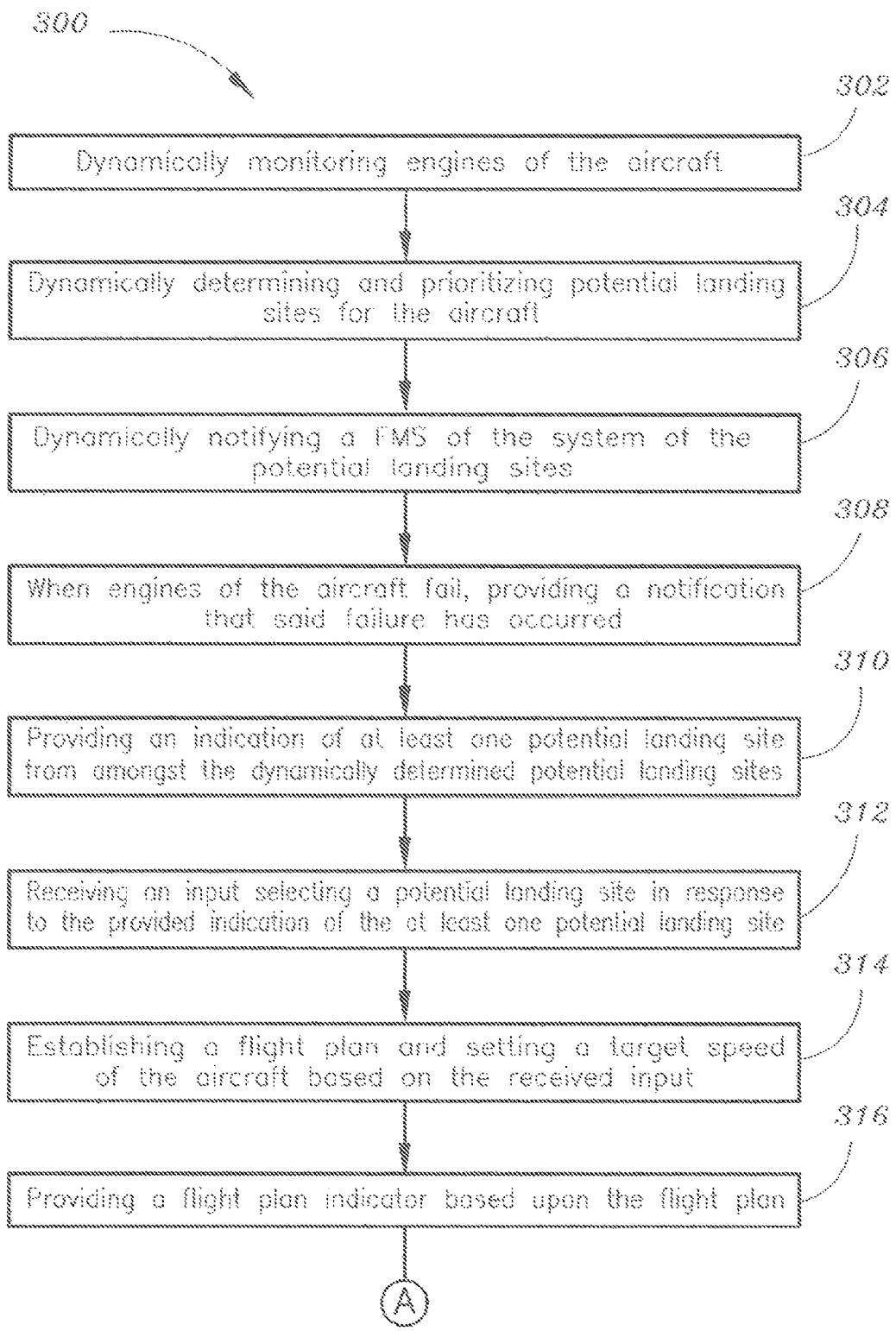
FIGS. 3A and 3B depict a flow chart illustrating a method for providing navigation (ex.—dual engines out mode navigation), such as via the flight controls system shown in FIG. 1, in accordance with a further exemplary embodiment of the present disclosure.
Figure 3B:
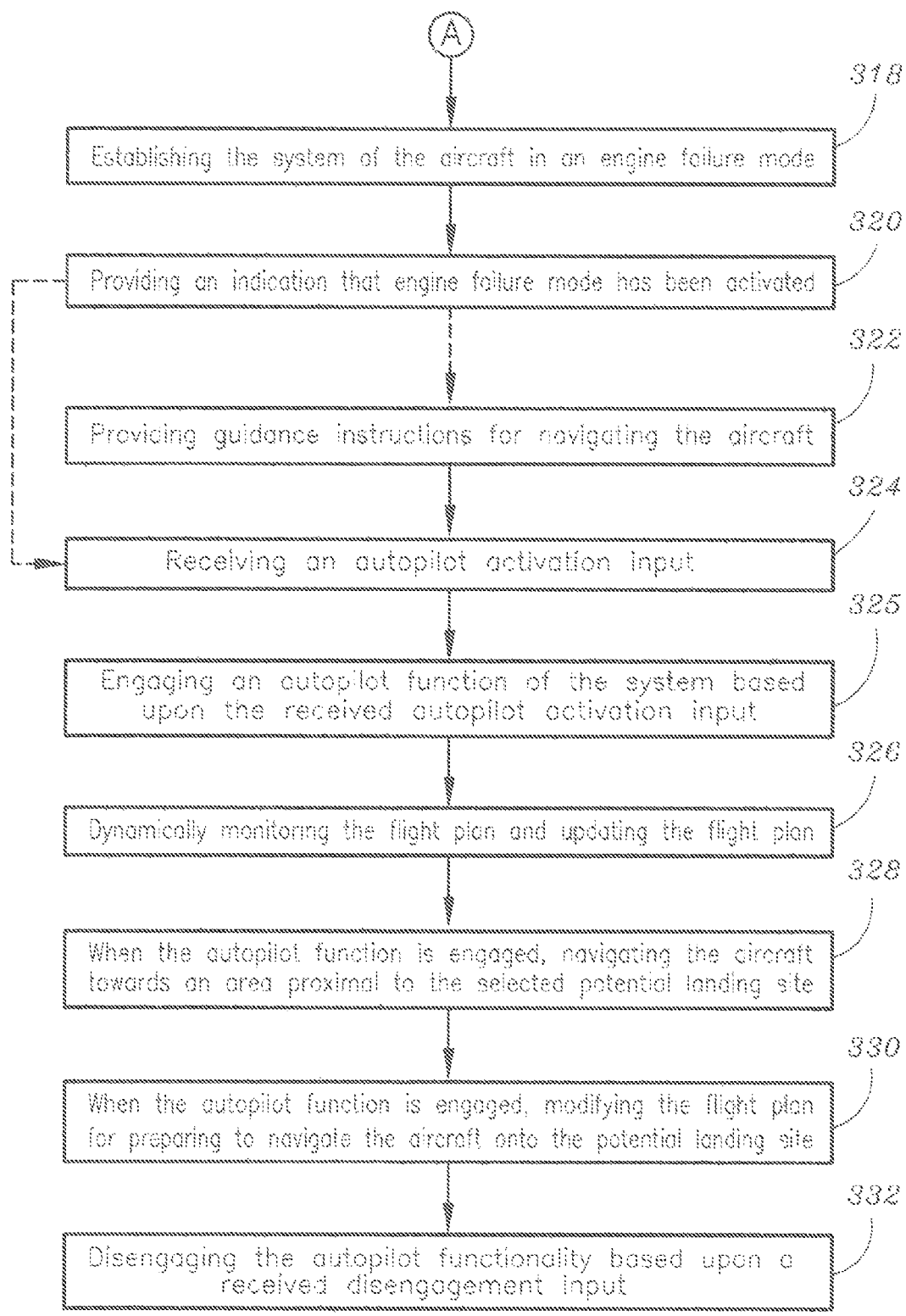

Referring to FIGS. 3A and 3B, a flowchart illustrating a method for navigating an aircraft via a flight controls system implemented on-board the aircraft, such as the flight controls system 100 described above, in accordance with a further exemplary embodiment of the present disclosure is shown. The method 300 may include the step of dynamically monitoring engine status of the aircraft 302. For example, EICAS 112 of the system 100 may dynamically monitor the engine status of the aircraft. In further embodiments, the method 300 may further include the step of dynamically determining and prioritizing potential landing sites for the aircraft 304. For instance, the EMMS 116 of the system 100 may dynamically (ex.—continuously) query the NAV database 108 of the FMS 106 to determine/compute the best (ex.—nearest) airports and runways for the aircraft to land at based upon the aircraft's current locations. In still further embodiments, the method 300 may further include dynamically notifying a FMS of the system of the potential landing sites 306.

In exemplary embodiments of the present disclosure, the method 300 may further include the step of, when engines (ex.—all engines) of the aircraft fail, providing a notification that said failure has occurred 308. For example, when the engines of the aircraft fail, EICAS 112 of the system 100 may notify a window manager (WM) of the system 100 that the engines have failed. In further embodiments of the present disclosure, the method 300 may further include the step of providing an indication of at least one potential landing site from amongst the dynamically determined potential landing sites 310. For instance, a windows manager (WM) of the system 100 may reconfigure a display (ex.—a multi-function display (MFD)) of the system 100 to display a lateral map (ex.—full-screen map) having a pre-defined range, overlays, and including indicators (ex.—symbols) showing emergency airports/runways (ex.—nearest airports/runways) at which the aircraft could land. Further, the FMS 106 of the system 100 may cause a user input prompt (ex.—a dialog box) to be displayed which allows a user (ex.—a pilot) to select which of the emergency airport and/or runways the aircraft should be directed to.

In embodiments of the present disclosure, the method 300 may further include receiving an input selecting a potential landing site in response to the provided indication of the at least one potential landing site 312. For instance, the pilot may choose an airport via a user input provided to the system 100 in response to a list of potential emergency airports/runways at which the aircraft may land. In further embodiments, the method 300 may further include the step of establishing (ex.—updating) a flight plan and setting a target speed of the aircraft based on the received input 314.

In exemplary embodiments of the present disclosure, the method 300 may further include providing a flight plan indicator based upon the flight plan 316. For example, the FMS 106 of the system 100 may display information about the flight plan on a lateral map via a display of the system 100. In further embodiments of the present disclosure, the method 300 further includes establishing the system of the aircraft in an engine failure mode 318. For instance, the system 100 of the aircraft may be established in engine failure mode (ex.— dual engine out mode) in response to the received input. In establishing the system 100 in (ex.—activating; engaging) the engine failure mode, displays of the system 100 may select the FMS 106 of the system 100 as the navigation source of the aircraft (if necessary) and may notify EICAS 112. Further, the AFCS 114 may select a NAV and VNAV mode for the aircraft.

In embodiments of the present disclosure, the method 300 may further include providing an indication that engine failure mode has been activated 320. For example, the system 100 may provide a CAS message that the engine failure mode has been engaged/activated.

In exemplary embodiments of the present disclosure, the method 300 may further include providing guidance instructions for navigating the aircraft 322. For example, the AFCS 114 of the system 100 may provide guidance (ex.—navigation) instructions to the pilot via a flight director (FD) of the system 100 for. In further embodiments, the method 300 may further include the step of receiving an autopilot activation input 324 and activating (ex.—engaging) an autopilot function of the system based upon the received autopilot activation input 325.

In embodiments of the present disclosure, the method 300 may further include at least one of: dynamically monitoring the flight plan and updating the flight plan 326. For instance, the EMMS 116 of the system 100 may continuously monitor and update the flight plan as necessary. In further embodiments of the present disclosure, the method 300 may further include, when the autopilot function is engaged, navigating the aircraft towards an area proximal to the selected potential landing site 328. For example, the EMMS 116 of the system 100 may navigate the aircraft to an acquisition loiter point near the selected potential landing site (ex.—to an acquisition loiter point near and above a runway) and may allow the aircraft to gradually descend (ex.—spiral downward). In still further embodiments of the present disclosure, the method 300 may further include, when the autopilot function is engaged, modifying the flight plan for preparing to navigate the aircraft onto the potential landing site 330. For example, after the aircraft has navigated to the acquisition loiter point and has engaged in its downward spiral, EMMS 116 may modify the flight plan, so as to cause the aircraft to steer towards the runway. In preparing for the landing, when the pilot ascertains that landing is assured, he/she may provide an input for lowering the flaps and landing gear of the aircraft. In further embodiments of the present disclosure, the method 300 may further include the step of disengaging the autopilot functionality based upon a received disengagement input 332. For instance, if the autopilot function was engaged, in preparing for the landing, the pilot may provide an input for disengaging the autopilot function. The pilot may then flare the aircraft to a safe landing.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method implemented as a set of instructions stored on a non-transitory medium and executed by an on-board processor for navigating an aircraft via a flight controls system on-board the aircraft, the method comprising:
    dynamically determining safe zones and navigation paths to the safe zones for the aircraft by the on-board processor;
    receiving a mode input from onboard the aircraft for causing a safe mode of the system to be engaged;
    establishing the system in the safe mode in response to the received mode input;
    causing a mode engage status indicator to be provided by the on-board flight controls system; and
    providing navigational guidance via the on-board flight controls system to guide the aircraft via a selected navigation path included amongst the determined navigation paths to a safe zone included amongst the safe zones.

2. A method as claimed in claim 1, further comprising:
    determining a time at which navigation via the selected navigation path to a safe zone included amongst the determined safe zones is to commence; and
    providing a time indicator which indicates a proximity to the commencement time.

3. A method as claimed in claim 1, further comprising:
    when a subsequent mode input is received, disengaging from the safe mode.

4. A method as claimed in claim 1, further comprising:
    selecting a safe zone and navigation path to the safe zone from amongst the dynamically determined safe zones and navigation paths; and providing a flight plan to a Flight Management System (FMS) of the flight controls system based upon the selected safe zone and selected navigation path to the selected safe zone.

5. A method as claimed in claim 1, further comprising: monitoring aircraft threats.

6. A method as claimed in claim 5, further comprising: based upon said monitoring of threats, dynamically selecting a navigation path and safe zone, while navigating the aircraft to the safe zone prior to the determined safe zone navigation commencement time.

7. A method as claimed in claim 5, further comprising: when the safe zone navigation commencement time is reached, causing the flight plan to be excuted.

8. A method as claimed in claim 5, further comprising: navigating the aircraft to the selected safe zone via the selected navigation path; and
providing an indication that the aircraft is being navigated to the selected safe zone.

9. A method as claimed in claim 1, further comprising: providing an emergency message.

10. A method as claimed in claim 1, further comprising: when the aircraft has reached the selected safe zone, maintaining a position of the aircraft within the selected safe zone; and
providing an arrived and holding message.

11. A method implemented as a set of instructions stored on a non-transitory medium and executed by an on-board processor for navigating an aircraft via a flight controls system implemented on-board the aircraft, the method comprising:
dynamically monitoring engine status of the aircraft via the on-board processor;
dynamically determining and prioritizing potential landing sites for the aircraft;
dynamically notifying a Flight Management System (FMS) of the flight controls system of the potential landing sites;
when engines of the aircraft fail, providing a notification that said failure has occurred to at least one of a flight control system component, a pilot of the aircraft, and a crew of the aircraft; and
providing an indication of at least one potential landing site from amongst the dynamically determined potential landing sites.

12. A method as claimed in claim 11, further comprising:
receiving an input selecting a potential landing site in response to the provided indication of the at least one potential landing site; and
establishing a flight plan and setting a target speed of the aircraft based on the received input.

13. A method as claimed in claim 11, further comprising:
providing a flight plan indicator based upon a flight plan;
establishing the system of the aircraft in an engine failure mode; and
providing an indication that engine failure mode has been activated.

14. A method as claimed in claim 13, further comprising:
providing guidance instructions for navigating the aircraft.

15. A method as claimed in claim 13, further comprising:
receiving an autopilot activation input; and
engaging an autopilot function of the system based upon the received autopilot activation input.

16. A method as claimed in claim 13, further comprising:
dynamically monitoring the flight plan and updating the flight plan
when an autopilot function is engaged, navigating the aircraft towards an area proximal to the selected potential landing site;
when an autopilot function is engaged, modifying the flight plan for preparing to navigate the aircraft onto the potential landing site; and
disengaging the autopilot functionality based upon a received disengagement input.

17. The method as claimed in claim 1, wherein dynamically determining safe zones and navigation paths to the safe zones for the aircraft is based upon terrain data, obstacle data, weather data and traffic data.

18. The method as claimed in claim 11, wherein dynamically determining and prioritizing potential landing sites for the aircraft is based upon airport location, runway length, runway width and surface wind.

* * * * *